(12) United States Patent
Okura et al.

(10) Patent No.: US 8,214,198 B2
(45) Date of Patent: Jul. 3, 2012

(54) TRANSLATION SUPPORTING PROGRAM, APPARATUS, AND METHOD

(75) Inventors: Seiji Okura, Kawasaki (JP); Tomoki Nagase, Kawasaki (JP); Akira Ushioda, Kawasaki (JP); Masaru Fuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 12/638,476

(22) Filed: Dec. 15, 2009

(65) Prior Publication Data

US 2010/0094617 A1 Apr. 15, 2010

Related U.S. Application Data

(63) Continuation of application No. PCT/JP2007/063358, filed on Jul. 4, 2007.

(51) Int. Cl.
*G06F 17/28* (2006.01)
(52) U.S. Cl. .......................................................... 704/2
(58) Field of Classification Search .................... 704/1–8
See application file for complete search history.

(56) References Cited

U.S. PATENT DOCUMENTS

| | | | |
|---|---|---|---|
| 7,219,051 B2 * | 5/2007 | Moore | 704/5 |
| 7,308,398 B2 * | 12/2007 | Yamashita et al. | 704/2 |
| 7,349,839 B2 * | 3/2008 | Moore | 704/2 |
| 7,983,898 B2 * | 7/2011 | Moore | 704/2 |
| 2003/0040900 A1 * | 2/2003 | D'Agostini | 704/2 |
| 2006/0080080 A1 | 4/2006 | Yamashita et al. | |

FOREIGN PATENT DOCUMENTS

| | | |
|---|---|---|
| JP | A 5-342259 | 12/1993 |
| JP | 09-179868 | 7/1997 |
| JP | A 2005-339087 | 12/2005 |
| WO | WO 2004/107203 A1 | 12/2004 |

OTHER PUBLICATIONS

"Japanese Office Action" mailed by JPO and corresponding to Japanese application No. 2009-521484 on May 8, 2012, with partial English translation.

* cited by examiner

*Primary Examiner* — Samuel G Neway
(74) *Attorney, Agent, or Firm* — Fujitsu Patent Center

(57) ABSTRACT

In a computer for supporting translation work, an acquisition unit retrieves a pair of original document including a plurality of original sentences and translated document including a plurality of translated sentences from a document storage unit. An estimation unit counts the number of original sentences included in the original document and the number of translated sentences included in the translated document, and estimates a position of a translated sentence corresponding to each original sentence in the translated document based on a ratio of the number of original sentences to the number of translated sentences and a positional order of each original sentence in the original document. An alignment unit aligns each original sentence with the translated sentence located at the estimated position, and outputs information indicating the correspondences between the original and translated sentences.

9 Claims, 15 Drawing Sheets

111

This is an apple, but that is an orange.
This is our strategy.
This is a pen.
This strategy is good.
I think this is good.
That idea, however, is bad.
I don't think your strategy is good.
Your strategy is bad, and your friend's strategy is good.

112

これはりんごです。(Kore wa ringo desu.)
しかし、あれはオレンジです。(Shikashi, are wa orenzi desu.)
これは我々の戦略です。(Kore wa wareware no senryaku desu.)
これはペンです。(Kore wa pen desu.)
このストラティジィは良い。(Kono sutorathizi wa yoi.)
これはよいと思いますが、あのアイデアは悪いです。(Kore wa yoi to omoimasu ga, ano aidea wa warui desu.)
私は、あなたのストラテジィはよいとは思いません。(Watashi wa, anata no sutoratezi wa yoitowa omoimasen.)
あなたのストラテジィは悪いです。(Anata no sutoratezi wa warui desu.)
あなたの友達のストラテジィはよいです。(Anata no tomodachi no sutoratezi wa yoi desu.)

110 DOCUMENT STORAGE UNIT

FIG. 4

| SENTENCE CORRESPONDENCE TABLE ||
|---|---|
| ORIGINAL SENTENCE NUMBER | TRANSLATED SENTENCE NUMBER |
| 1 | 1, 2 |
| 2 | 1, 2, 3 |
| 3 | 2, 3, 4 |
| 4 | 4, 5, 6 |
| 5 | 5, 6, 7 |
| 6 | 6, 7, 8 |
| 7 | 7, 8, 9 |
| 8 | 8, 9 |

TRANSLATED WORD CONFIRMATION SCREEN

| ORIGINAL | TRANSLATION |
|---|---|
| This is an apple, but that is an orange. | これはりんごです。(Kore wa ringo desu.) しかし、あれはオレンジです。(Shikashi, are wa orenzi desu.) |
| This is our *strategy*. | これは我々の*戦略*です。(Kore wa wareware no *senryaku* desu.) |
| This is a pen. | これはペンです。(Kore wa pen desu.) |
| This [strategy] is good. | このストラティジィは良い。(Kono sutorathizi wa yoi.) |
| I think this is good. | これはよいと思います。(Kore wa yoi to omoimasu ga, ano aidea wa warui desu.) |
| That idea, however, is bad. | ますが、あのアイデアは悪いです。 |
| I don't think your *strategy* is good. | 私は、あなたのストラテジィはよいとは思いません。(Watashi wa, anata no *sutoratezi* wa yoitowa omoimasen.) |
| Your *strategy* is bad, and your friend's *strategy* is good. | あなたのストラテジィは悪いです。(Anatano *sutoratezi* wa warui desu.) あなたの友達のストラテジィはよいです。(Anata no tomodachi no *sutoratezi* wa yoi desu.) |

(MAIN TERMINOLOGY LIST IN USE=TERMINOLOGY LIST 2)

[CHANGE]  [ALL CHANGE]

TRANSLATED WORD CONFIRMATION SCREEN

| ORIGINAL | TRANSLATION |
|---|---|
| This is an apple, but that is an orange. | これはりんごです。(Kore wa ringo desu.) |
| This is our *strategy*. | しかし、あれはオレンジです。(Shikashi, are wa orenzi desu.) |
| This is a pen. | これは我々の戦略です。(Kore wa wareware no *senryaku* desu.) |
| This strategy is good. | これはペンです。(Kore wa pen desu.) |
| I think this is good. | このストラティジィは良い。(Kono sutorathizi wa yoi.) |
| That idea, however, is bad. | これはよいと思い INSERT (TERMINOLOGY LIST 2) <br> strategy ストラテジィ (Sutoratezi) <br> (Kore wa yoi to om~~~~~~~~~~~) |
| I don't think your *strategy* is good. | 私は、あなたのストラテジィはよいとおもいません。(Watashi wa, anatano sutoratezi wa yoitowa omoimasen.) |
| Your *strategy* is bad, and your friend's *strategy* is good. | あなたのストラテジィは悪いです。(Anatano sutoratezi wa warui desu.) |
| | あなたの友達のストラテジィはよいです。(Anata no tomodachi no sutoratezi wa yoi desu.) |

(MAIN TERMINOLOGY LIST IN USE = TERMINOLOGY LIST 2)

CHANGE    ALL CHANGE

FIG. 12

TRANSLATED WORD CONFIRMATION SCREEN

| ORIGINAL | TRANSLATION |
|---|---|
| This is an apple, but that is an orange. | これはりんごです。(Kore wa ringo desu.) しかし、あれはオレンジです。(Shikashi, are wa orenzi desu.) |
| This is our <u>strategy</u>. | これは我々の<u>ストラテジィ</u>です。(Kore wa wareware no <u>sutoratezi</u> desu.) |
| This is a pen. | これはペンです。(Kore wa pen desu.) |
| This <u>strategy</u> is good. | この<u>ストラテジィ</u>は良い。(Kono <u>sutoratezi</u> wa yoi.) |
| I think this is good. | これはよいと思いますが、あのアイデアは悪いです。(Kore wa yoi to omoimasu ga, ano aidea wa warui desu.) |
| That idea, however, is bad. | |
| I don't think your <u>strategy</u> is good. | 私は、あなたの<u>ストラテジィ</u>はよいとは思いません。(Watashi wa, anata no <u>sutoratezi</u> wa yoitowa omoimasen.) あなたの<u>ストラテジィ</u>は悪いです。(Anatano <u>sutoratezi</u> wa warui desu.) |
| Your <u>strategy</u> is bad, and your friend's <u>strategy</u> is good. | あなたの友達の<u>ストラテジィ</u>はよいです。(Anata no tomodachi no <u>sutoratezi</u> wa yoi desu.) |

21c

CHANGE   ALL CHANGE (MAIN TERMINOLOGY LIST IN USE=TERMINOLOGY LIST 2)

FIG. 13 ing process;

TRANSLATION SUPPORTING PROGRAM, APPARATUS, AND METHOD

This application is a continuing application, filed under 35 U.S.C. §111(a), of International Application PCT/JP2007/063358, filed Jul. 4, 2007.

FIELD

The embodiment discussed herein is related to a computer-readable recording medium storing a translation supporting program, and an apparatus and method for supporting translation work.

BACKGROUND

In recent years, with rapid development of transportation and communication networks, an enormous amount of information has come to be globally distributed. For instance, literary works, business documents, technical articles, and patent documents spread across international boarders. Most of such information includes linguistic information expressed in natural language such as English and Japanese. For using or distributing information, there are increasing needs to translate the information from original language to other languages. However, most of business-related documents are still translated by translation specialists. This is because existing machine translation techniques are still not sufficient for automatically producing good enough translations for business use.

In order to help translators produce fast and high-quality translations, some techniques for supporting translation work have been demanded. One of such demands is a technique of automatically extracting correspondences between words by comparing original text with its translation. This is for verifying the translation by comparing words in the translation with their corresponding words in the original text, which is fairly necessary in translation work. Such a comparison technique is also useful for saving pairs of original text and its translation as translation examples for later use.

There exists a technique of receiving one original sentence and one translated sentence and aligning words with reference to bilingual dictionaries for original language and translation language in order to visually represent detected correspondences (for example, see Japanese Laid-open Patent Publication No. 2005-339087). There also exists a technique of consulting terminology dictionaries to automatically correct errors in translation (for example, see Japanese Laid-open Patent Publication No. 05-342259). Further, for receiving and comparing documents including plural sentences, not sentence by sentence, there exists a technique of, in response to specification of partial correspondences between original and translated sentences, estimating other correspondences between the original and translation sentences before and after the specified correspondences in order to reduce a workload on a translator (for example, see International Publication Pamphlet No. WO2004/107203).

However, the techniques disclosed in the above Japanese Laid-open Patent Publications Nos. 2005-339087 and 05-342259 and International Publication Pamphlet No. WO2004/107203 have drawbacks that a workload of confirming translated words is not so reduced if many sentences need to be compared between an original document and its translation. More specifically, the techniques disclosed in the Japanese Laid-open Patent Publications Nos. 2005-339087 and 05-342259 impose conditions that accurate correspondences between original sentences and translated sentences need to be specified, and if the correspondences have any error, the techniques malfunction. The technique disclosed in International Publication Pamphlet No. WO2004/107203, on the other hand, needs partial accurate correspondences between sentences to be specified as a reference in order to estimate the other correspondences between sentences. Accordingly, an extra workload is placed on a translator.

Especially, it is not always the case that one original sentence corresponds to one translated sentence. One-to-two or two-to-one correspondence also exists. However, if an original document and its translation have a different number of sentences, the techniques disclosed in International Publication Pamphlet No. WO2004/107203 may reduce accuracy in correspondence estimation, which brings about an extra workload of correcting the estimated correspondences.

SUMMARY

According to an aspect of the invention, in a computer-readable recording medium storing a translation supporting program for aligning original sentences and translated sentences, the translation supporting program causes a computer to perform as: an acquisition unit which retrieves a pair of original document and translated document from a document storage unit storing the original document including a plurality of original sentences and the translated document including a plurality of translated sentences; an estimation unit which counts the number of original sentences included in the retrieved original document and the number of translated sentences included in the retrieved translated document, and estimates a position of a translated sentence corresponding to each original sentence in the translated document based on a ratio of the number of original sentences to the number of translated sentences and a positional order of each original sentence in the original document; and an alignment unit which aligns each original sentence with the translated sentence located at the position estimated by the estimation unit, and outputs information indicating correspondences between the original sentences and the translated sentences.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 4 illustrates an example of original and translated documents;

Figure 6:
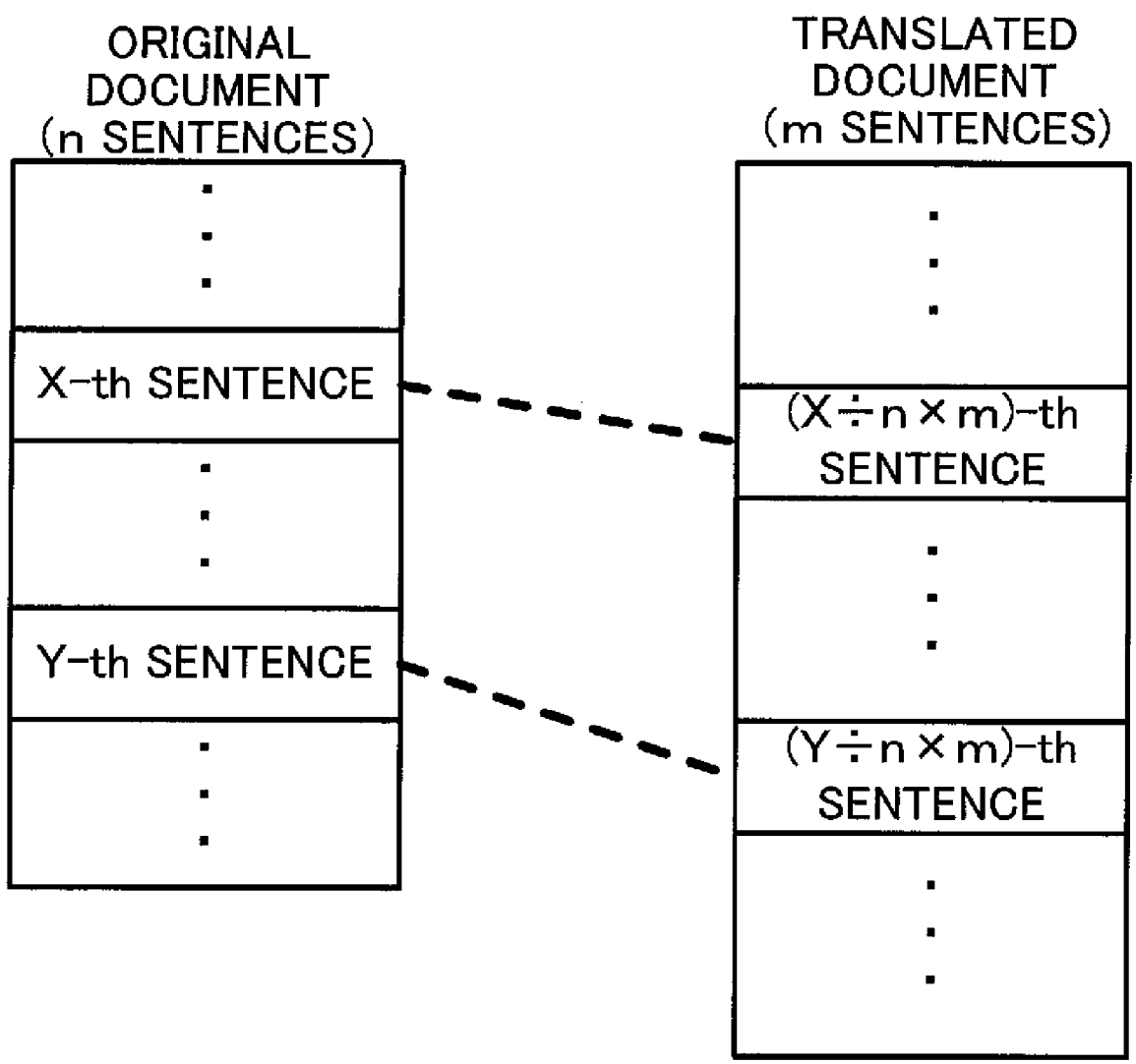
Figure 7:
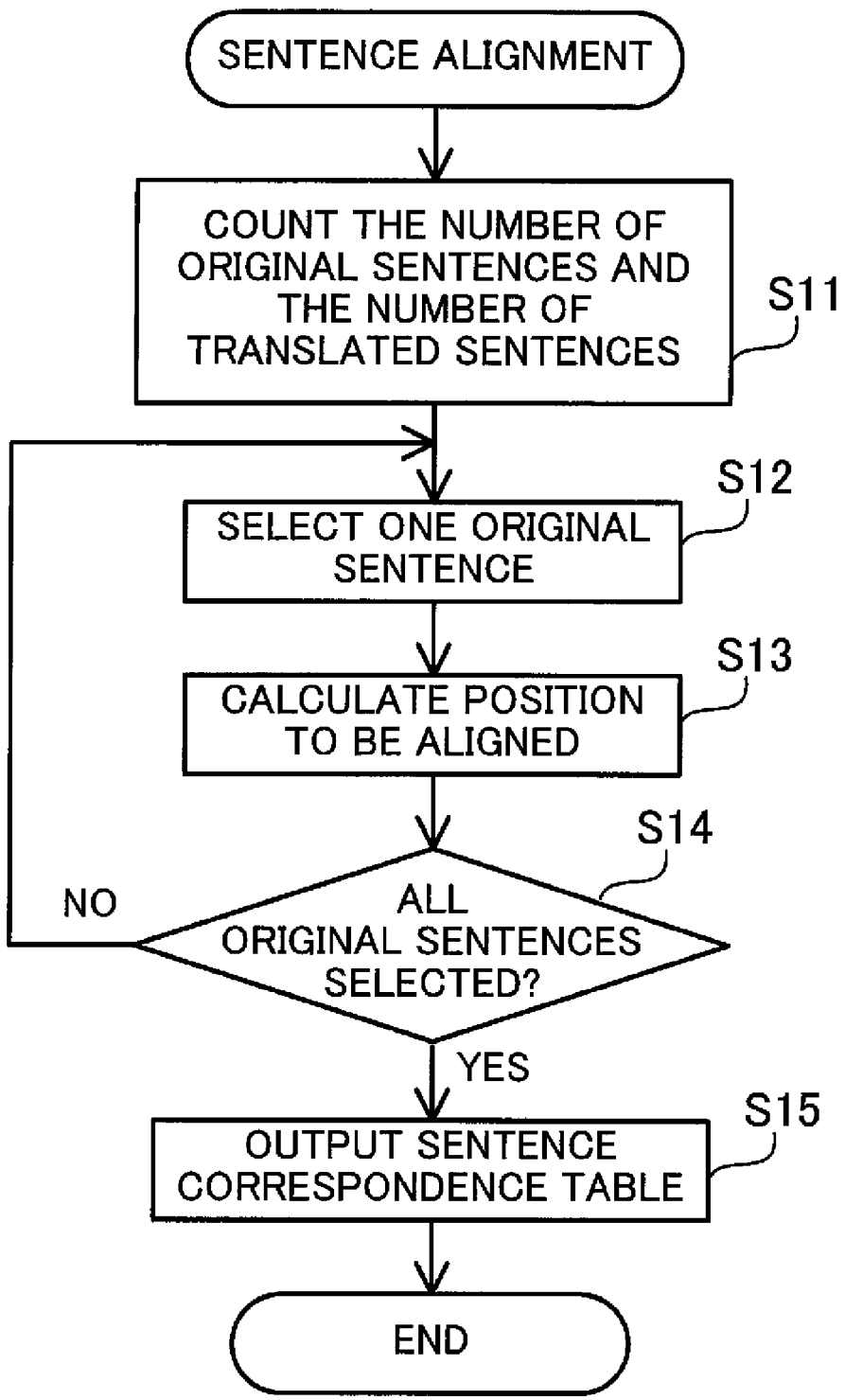
Figure 9:
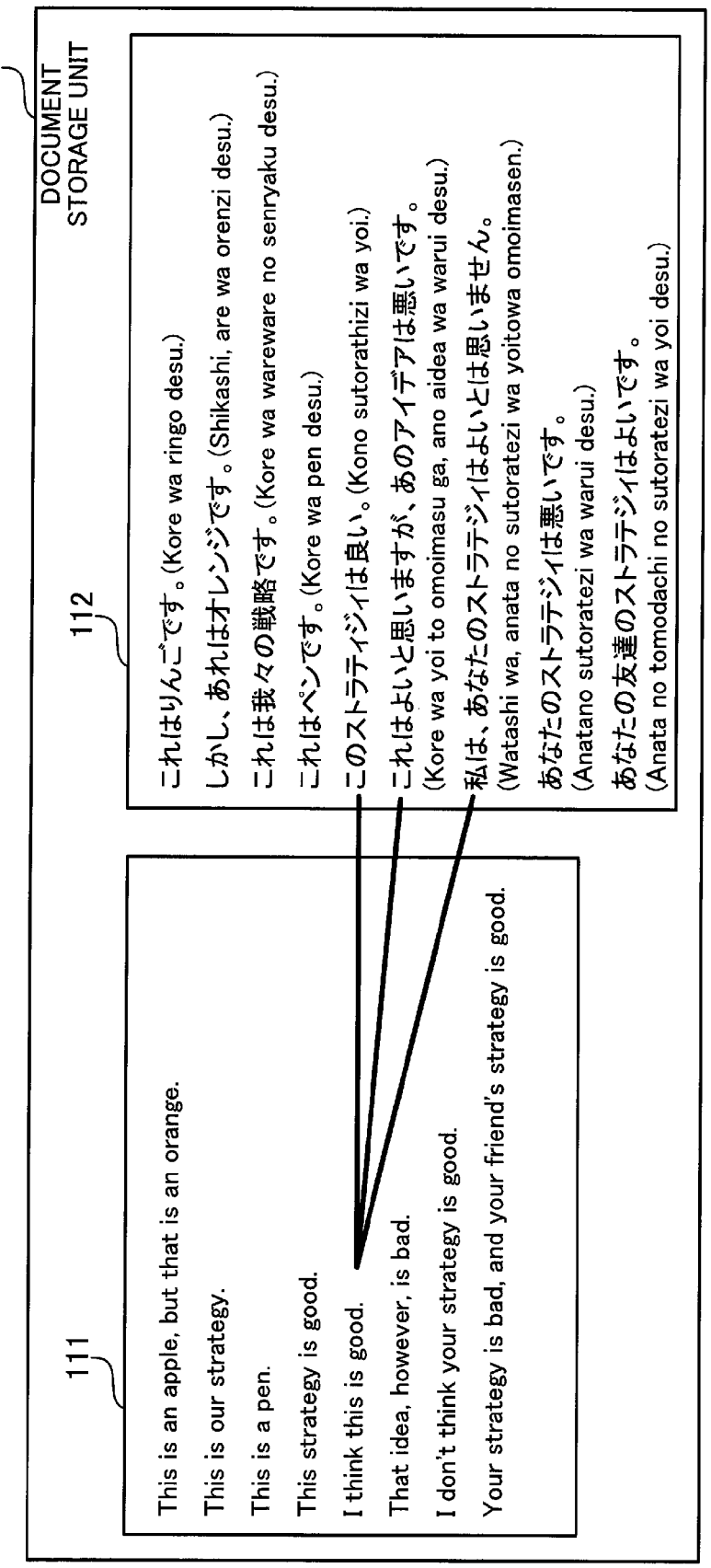
Figure 10:
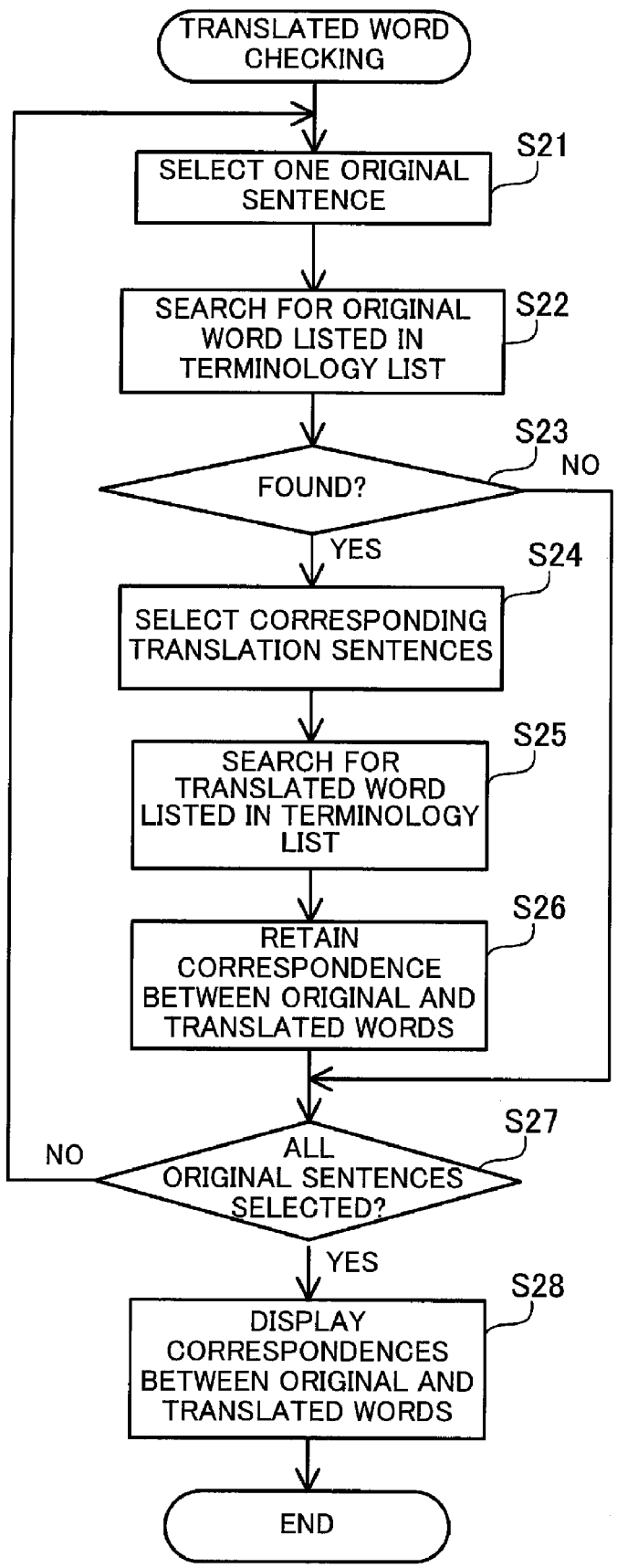
Figure 14:
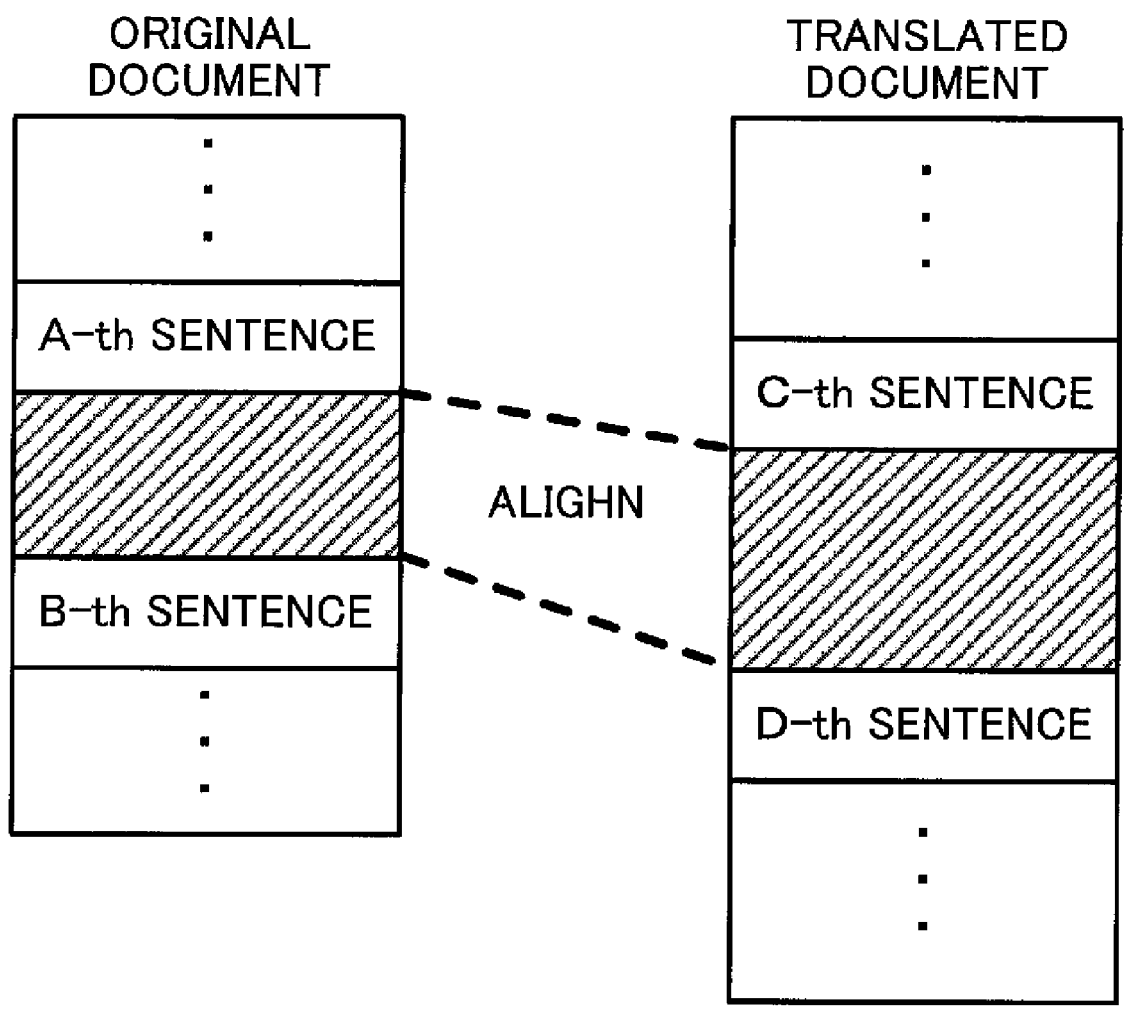

FIG. 6 schematically illustrates a principle of sentence alignment;

FIG. 7 is a flowchart illustrating a sentence alignment process;

FIG. 8 illustrates an example data structure of a sentence correspondence table;

FIG. 9 schematically illustrates an example result of the sentence alignment;

FIG. 10 is a flowchart illustrating a translated word checking process;

FIG. 11 is the first example of a translated word confirmation screen;

FIG. 12 is the second example of the translated word confirmation screen;

FIG. 13 is the third example of the translated word confirmation screen;

FIG. 14 schematically illustrates a principle of sentence alignment review; and

Figure 15:
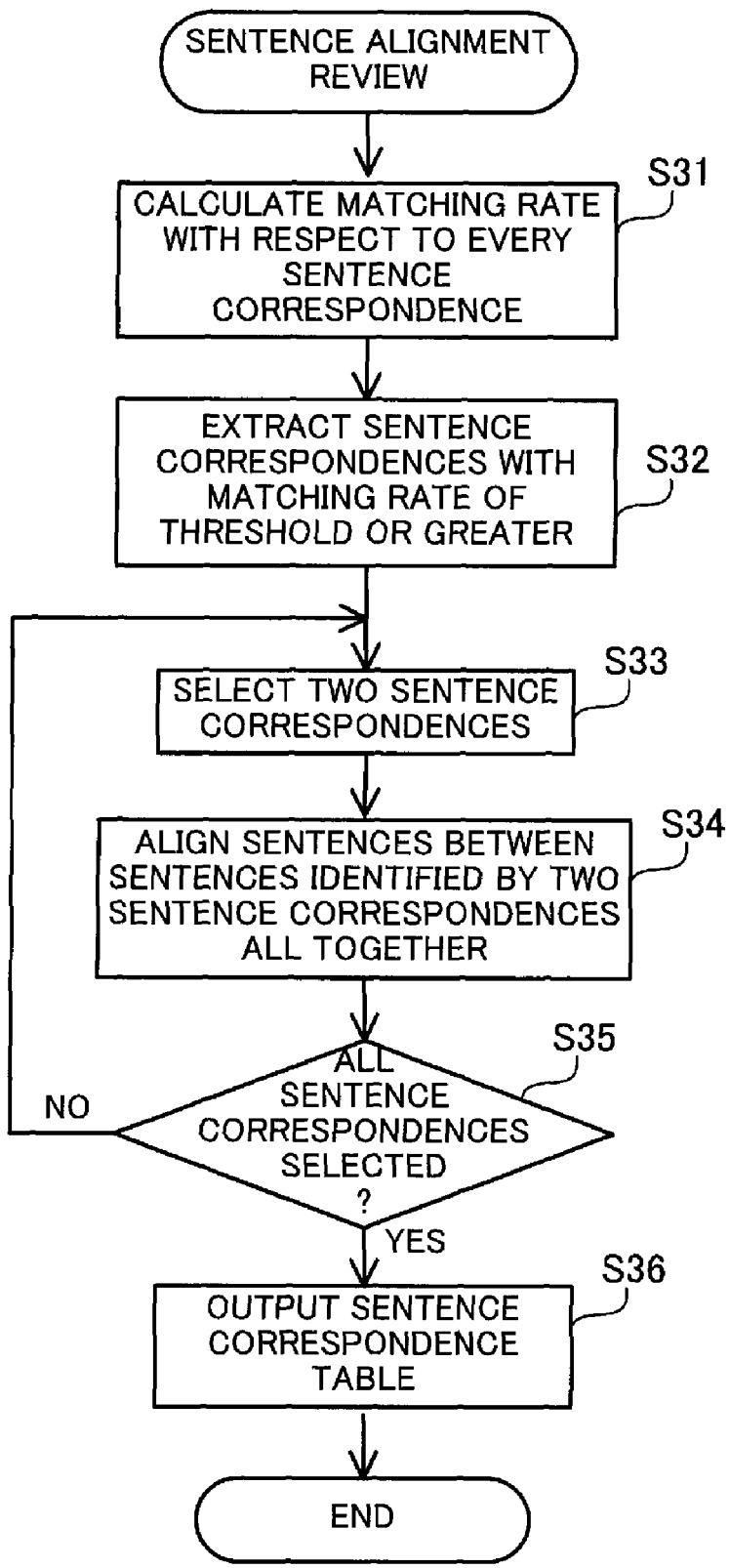

FIG. 15 is a flowchart illustrating a sentence alignment review process.

DESCRIPTION OF EMBODIMENT(S)

An embodiment of the present invention will now be described with reference to the accompanying drawings, wherein like reference numerals refer to like elements throughout.

Figure 1:
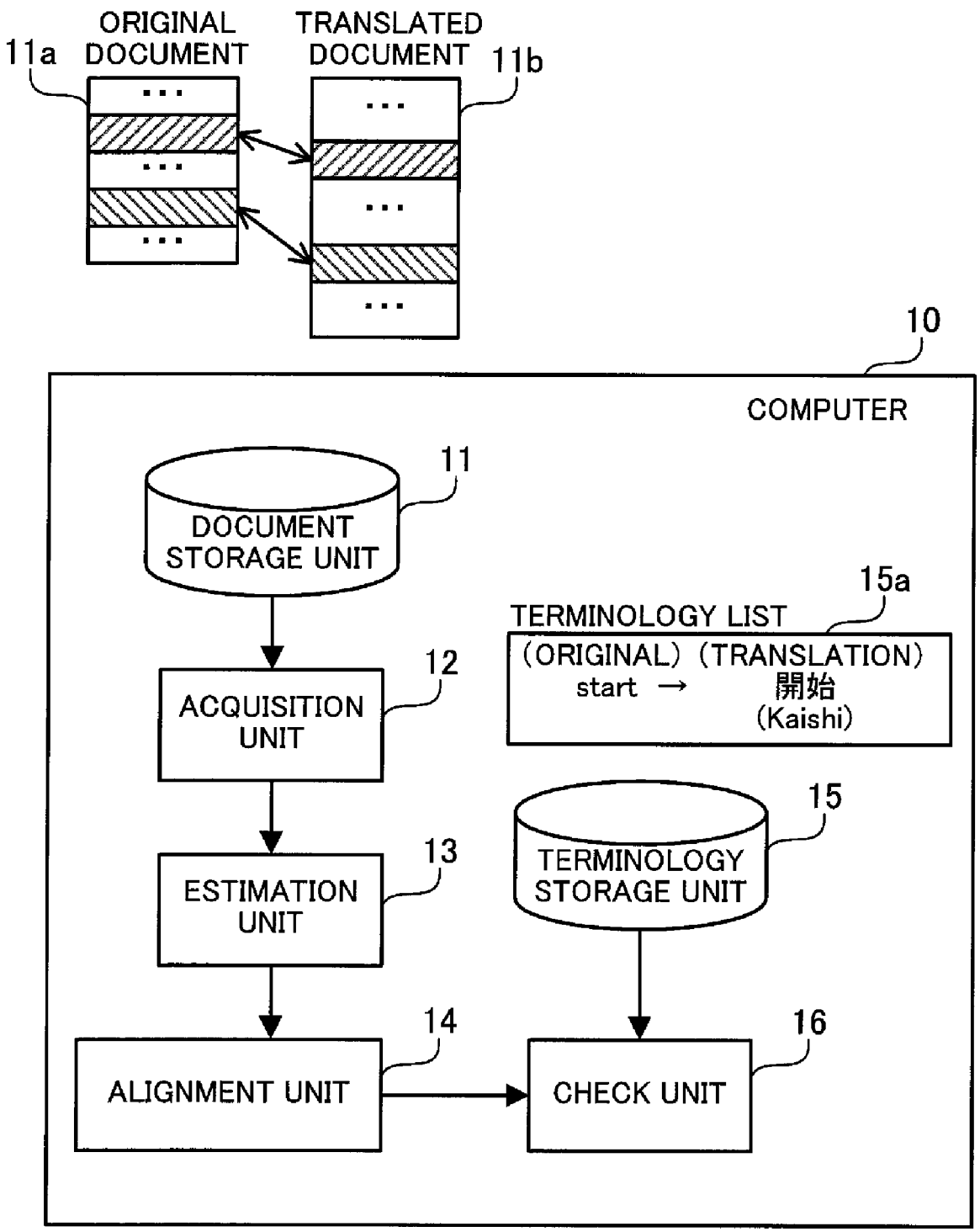
FIG. 1 illustrates an overview of an embodiment.

FIG. 1 illustrates an overview of the embodiment. The illustrated computer 10 is designed to compare original sentences of an original document 11a with translated sentences of a translated document 11b to check if the translation is accurate. To this end, the computer 10 has a document storage unit 11, an acquisition unit 12, an estimation unit 13, an alignment unit 14, a terminology storage unit 15, and a check unit 16. These units can be realized by the computer 10 executing a specified translation supporting program.

The document storage unit 11 stores the original document 11a and the translated document 11b. The original document 11a includes a plurality of original sentences and the translated document 11b also includes a plurality of translated sentences. The translated document 11b is a translation of the original document 11a in a different natural-language.

The acquisition unit 12 retrieves the original document 11a and the translated document 11b from the document storage unit 11.

The estimation unit 13 counts the number of sentences included in each of the original document 11a and translated document 11b retrieved by the acquisition unit 12. Then, the estimation unit 13 compares the number of original sentences with the number of translated sentences to estimate the position of a translated sentence corresponding to each original sentence in the translated document 11b. For example, consider a case where a ratio of the number of original sentences to the number of translated sentences is 2:3. The estimation unit 13 estimates that a translated sentence corresponding to the forth original sentence, counted from the first one, is the sixth sentence in the translated document 11b, counted from the first one.

The alignment unit 14 aligns each original sentence with a translated sentence located at a position estimated by the estimation unit 13. The alignment unit 14 also aligns each original sentence with translated sentences located within a predetermined range before and after the estimated position, for instance, with translated sentences one before and after the estimated position. Then, the alignment unit 14 outputs information indicating the correspondences between the original and translated sentences.

The terminology storage unit 15 stores a terminology list 15a. The terminology list 15a is a dictionary which lists an original word and its appropriate translated word with respect to each term to be carefully translated. For example, this terminology list lists a word "Kaishi" as an appropriate translation for an original word "start".

When receiving the information indicating the correspondences between the original and translated sentences from the alignment unit 14, the check unit 16 checks aligned original and translated sentences to see if translation of each term matches the terminology list 15a stored in the terminology storage unit 15. For example, the check unit 16 extracts original words of terms from an original sentence and checks if appropriate translated words for the extracted original words appear in the corresponding translated sentences. Then, the check unit 16 displays the check results to the user of the computer 10.

With such a computer 10, the acquisition unit retrieves an original document 11a and a translated document 11b from the document storage unit 11. Then, the estimation unit 13 counts the number of original sentences and the number of translated sentences, and based on a ratio of the number of original sentences to the number of translated sentences, estimates a position in the translated document 11b where a translated sentence corresponding to each original sentence is located. Then the alignment unit 14 aligns each original sentence with a translated sentence located at the estimated position and translated sentences located within a predetermined range before and after the estimated position. Then, the check unit 16 checks the aligned original and translated sentences to see if translated words of terms match the terminology list 15a, and displays the check results to the user.

As described above, original sentences and translated sentences can be automatically aligned, which makes it possible to reduce a translation workload on the user of the computer 10. Especially, even if original sentences and translated sentences are different in number, sentence alignment can be performed throughout documents with high accuracy. In addition, by appropriately setting an allowable range before and after an estimated position, sentence alignment can be realized even if an original sentence and its corresponding translated sentence do not have the same relative positions. Then, as inappropriate translated words are automatically detected by comparing the original sentences with the aligned translated sentences, higher quality translation can be expected.

Now, one embodiment will be described in detail with reference to drawings. This embodiment uses one translation supporting apparatus which supports translation work. This translation supporting apparatus can be realized by a computer executing a specified translation supporting program.

Figure 2:
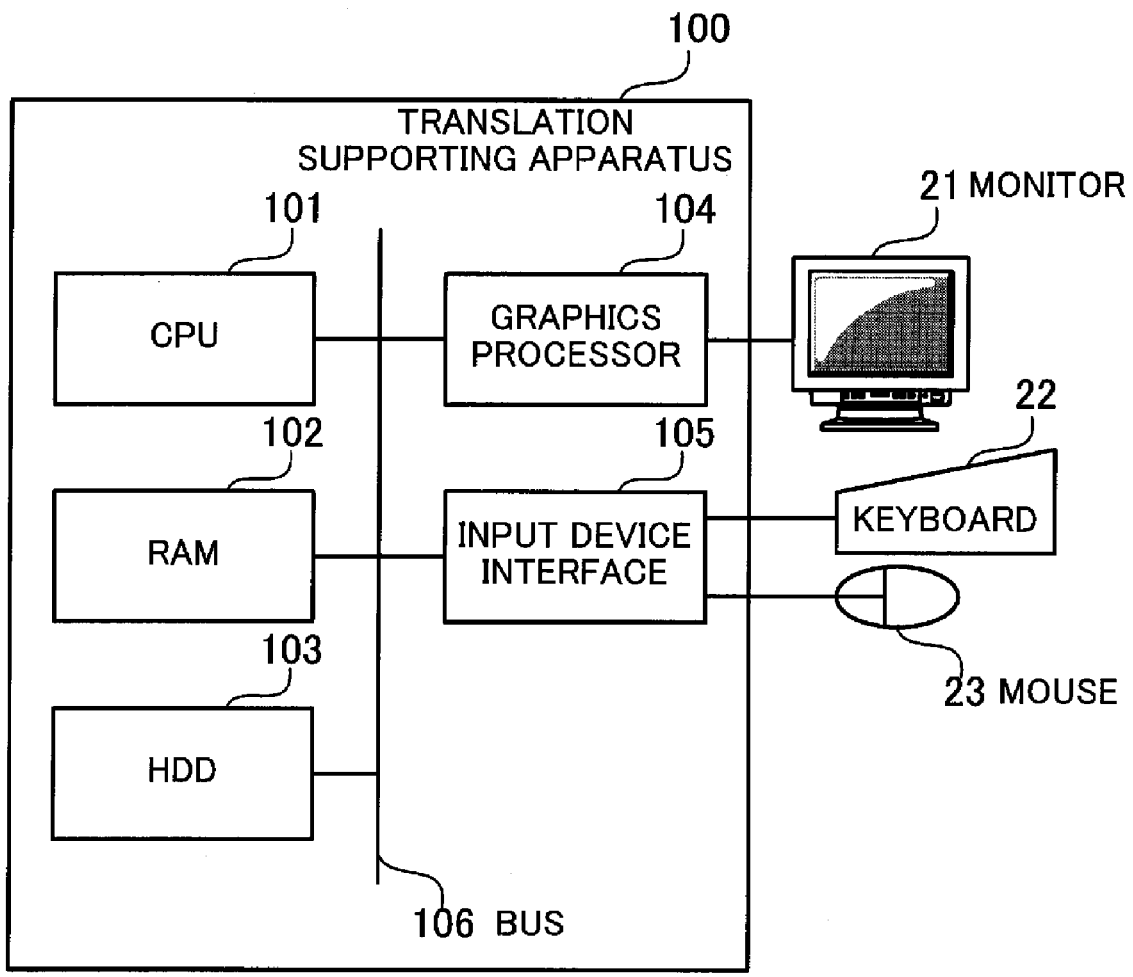
FIG. 2 illustrates a hardware configuration of a translation supporting apparatus.

FIG. 2 illustrates a hardware configuration of a translation supporting apparatus. The illustrated translation supporting apparatus 100 is entirely controlled by a central processing unit (CPU) 101. Connected to the CPU 101 via a bus 106 are a random access memory (RAM) 102, a hard disk drive (HDD) 103, a graphics processor 104, and an input device interface 105.

The RAM 102 temporarily stores at least part of operating system (OS) program and application programs to be executed by the CPU 101, as well as various data necessary for CPU processing. The HDD 103 stores the OS program and application programs, as well as various data necessary for CPU processing.

The graphics processor 104 is connected to a monitor 21, and is designed to display images on a screen of the monitor 21 under the control of the CPU 101. The input device interface 105 is connected to a keyboard 22 and a mouse 23, and is designed to transfer signals from the keyboard 22 and the mouse 23 to the CPU 101 via the bus 106.

With such a hardware configuration, the processing functions according to this embodiment can be realized.

The following describes the module configuration of the translation supporting apparatus 100.

Figure 3:
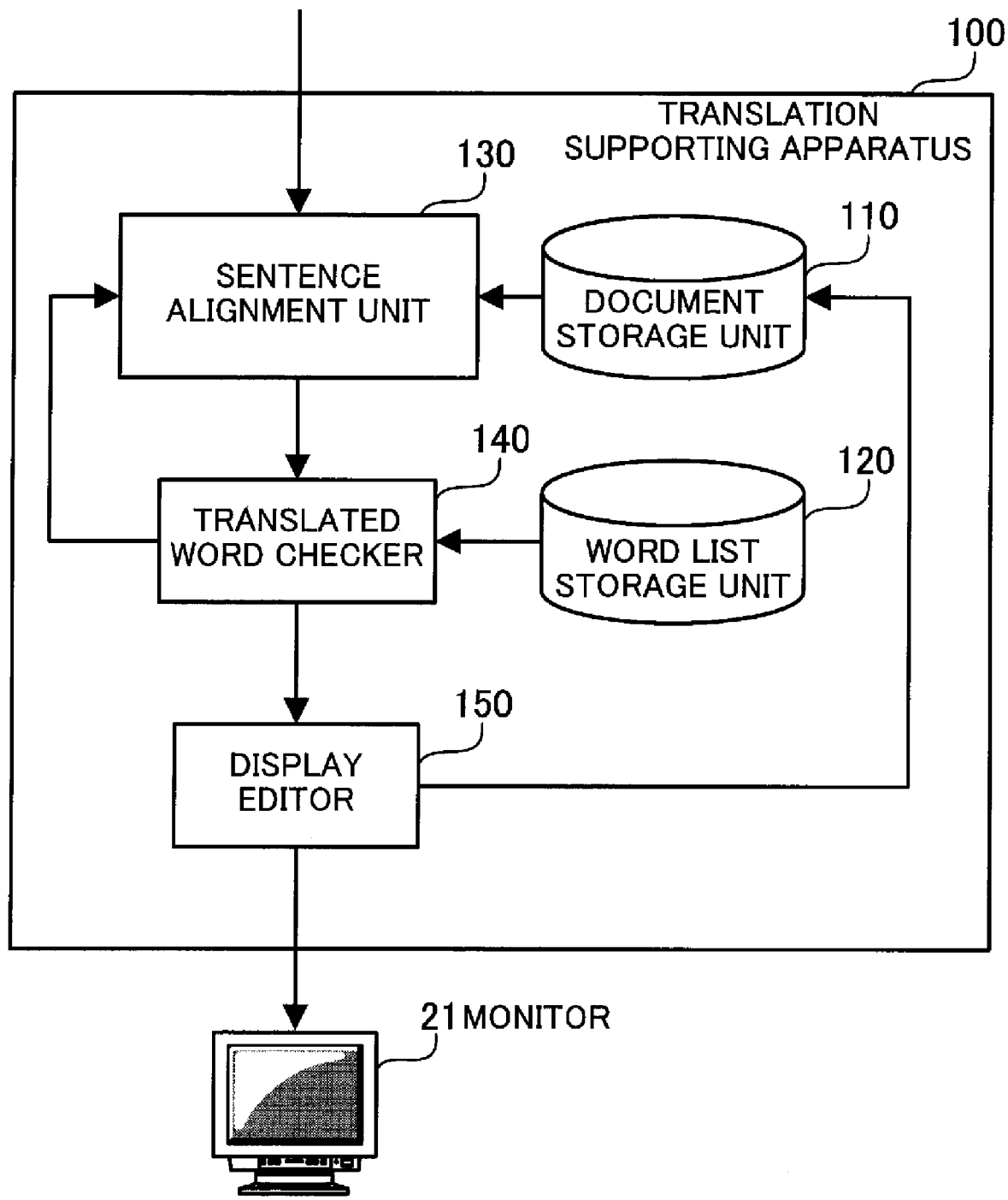
FIG. 3 is a block diagram of functions of the translation supporting apparatus.

FIG. 3 is a block diagram of functions of the translation supporting apparatus. The illustrated translation supporting apparatus 100 has a document storage unit 110, a word list storage unit 120, a sentence alignment unit 130, a translated word checker 140, and a display editor 150.

The document storage unit 110 stores at least one original document and at least one translated document. A translated document is a translation of an original document made by the user of the translation supporting apparatus 100. Each original document includes a plurality of original sentences. Each translated document also includes a plurality of translated sentences.

The word list storage unit 120 stores at least one terminology list. The terminology list is a dictionary which lists an original word and its appropriate translated word with respect to each term. The terminology list is referenced for using the same translated words throughout a translated document because words can be translated in many ways. A plurality of terminology lists may be prepared to use different appropriate words depending on field of contents to be translated and intended use of translated documents.

When the user of the translation supporting apparatus 100 specifies a pair of original and translated documents and issues a command to start checking, the sentence alignment unit 130 retrieves the specified original and translated documents from the document storage unit 110. Then, the sentence alignment unit 130 determines correspondences between the original sentences included in the original document and the translated sentences included in the translated document, and notifies the translated word checker 140 of them. In addition, upon receipt of an alignment review request from the translated word checker 140, the sentence alignment unit 130 reviews partial correspondences between the original and translated sentences, and notifies the translated word checker 140 of the review results.

When notified of the correspondences between the original and translated sentences from the sentence alignment unit 130, the translated word checker 140 checks aligned original and translated sentences with reference to a terminology list stored in the word list storage unit 120. More specifically, the translated word checker 140 checks if translated words in the translated sentences match the terminology list. Then, the translated word checker 40 notifies the display editor 150 of the check results.

In this connection, from among the terminology lists stored in the word list storage unit 120, one or more terminology lists to be used for the checking are previously specified by the user of the translation supporting apparatus 100. The translated word checker 140 consults the specified terminology lists for the checking. In addition, from among the one or more specified terminology lists, one terminology list is specified as a main terminology list which is used for correcting translated words.

In addition, when the translated word checker 140 checks pairs of original and translated sentences aligned by the sentence alignment unit 130 and detects a pair whose matching rate with the terminology list is less than a threshold, it issues an alignment review request to the sentence alignment unit 130. Such a pair is considered to have many terms whose original words appear in the original sentence but whose appropriate translated words do not appear in the translated sentence, and so to be likely an error in the alignment in the first place.

When receiving the check results from the translated word checker 140, the display editor 150 displays their details on the monitor 21. In addition, the display editor 150 corrects translated words according to operational inputs from the user of the translation supporting apparatus 100, and reflects the corrections on the translated document stored in the document storage unit 110. At this time, the translated sentences are corrected to match the previously specified main terminology list.

FIG. 4 illustrates an example of original and translated documents. The illustrated original document 111 and translated document 112 are stored in the document storage unit 110. The original document 111 is written in English while the translated document 112 is a Japanese translation of the original document 111.

The original document 111 includes eight original sentences while the translated document 112 includes nine translated sentences. In this case, the original sentences and the translated sentences are different in number. This is because good translation does not always involve only one-to-one correspondence between original and translated sentences, but often involve one-to-two and two-to-one correspondences.

More specifically, referring to the example of FIG. 4, the first original sentence corresponds to the first and second translated sentences. The second original sentence corresponds to the third translated sentence. The third original sentence corresponds to the forth translated sentence. The fourth original sentence corresponds to the fifth translated sentence. The fifth and sixth original sentences correspond to the sixth translated sentence. The seventh original sentence corresponds to the seventh translated sentence. The eighth original sentence corresponds to the eighth and ninth translated sentences.

Figure 5:
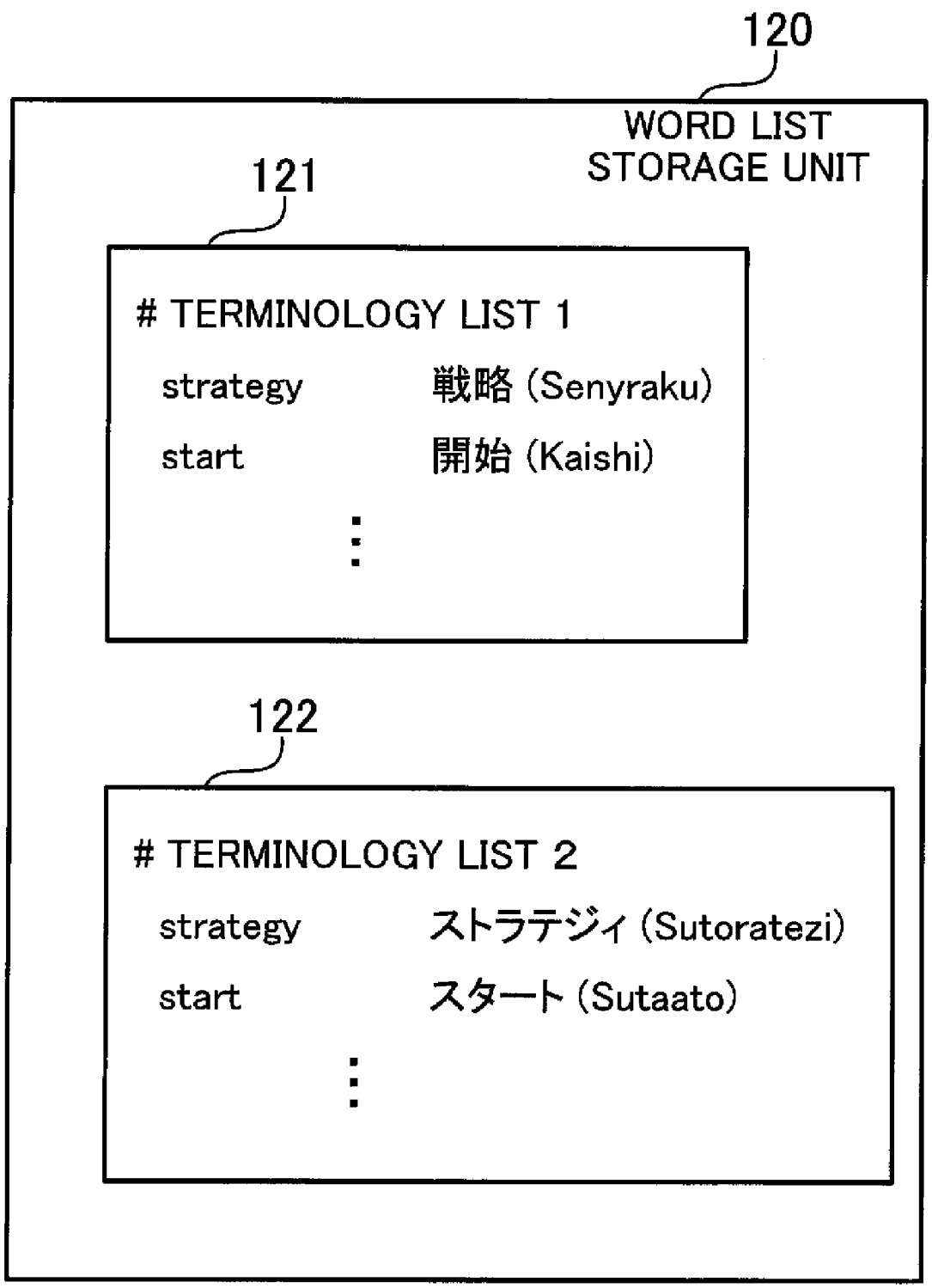
FIG. 5 illustrates an example of terminology lists.

FIG. 5 illustrates an example of terminology lists. The illustrated terminology lists 121 and 122 are stored in the word list storage unit 120. The terminology lists 121 and 122 list an original word and its appropriate translated word with respect to each term. In this example, original language is English and translation language is Japanese.

Terminology lists may list different appropriate translated words because appropriate words are different depending on the field of document and expected readers. For example, the terminology list 121 lists an appropriate translated word "Senryaku" for an original word "strategy", and "Kaishi" for "start". On the other hand, the terminology list 122 lists appropriate translated words "Sutoratezi" and "Sutaato" for original words "strategy" and "start", respectively.

It should be noted that what are listed in terminology lists are not limited to morphemes or words, but phrases and compound terms made up of plural words may be listed as there are also appropriate phrases and compound terms to be used.

The following describes processes to be performed by the translation supporting apparatus 100 with the above-described configuration and data structure, in an order of a sentence alignment process, a translated word checking process, and a sentence alignment review process.

FIG. 6 schematically illustrates a principle of sentence alignment. In the example of FIG. 4, the correspondences between the original and translated sentences are semantically determined by humans. However, computer is unable to do so. Therefore, the translation supporting apparatus 100 estimates correspondences between original and translated sentences with the principle illustrated in FIG. 6.

Concretely, it is considered that, in most cases, an original sentence and its corresponding translated sentence have the same relative positions in their documents. For example, it is assumed that an original document includes n original sentences (n is a natural number) and a translated document includes translated sentences (m is a natural number). In this case, considering a ratio of the number of original sentences (n) to the number of translated sentences (m), it is estimated that X-th original sentence (X is a natural number satisfying $1 \leq X \leq n$) corresponds to (X÷n×m)-th translated sentence.

Then, it is desirable that an allowable range is provided before and after an estimated sentence for margin of error. That is, the X-th original sentence is aligned with all translated sentences located within a range of (X÷n×m±α), i.e., between the (X÷n×m−α)-th translated sentence and the (X÷n×m+α)-th translated sentence. In this connection, α is previously set to zero or greater before the sentence alignment process is performed.

Generally, the results of the expression, X÷n×m±α, are rational numbers. However, a position of a sentence is represented by a natural number. Therefore, the fractional part after the decimal point needs to be processed in the middle of or after the calculation. For example, it can be considered that the parameter α is set to an integral number of zero or greater and then digits after the decimal point of the result of the expression, X÷n×m, are rounded up or disregarded. Alternatively, the parameter α may be set to a rational number of zero or greater and then digits after the decimal point of the result of the expression, X÷n×m±α, may be rounded up or disregarded.

FIG. 7 is a flowchart illustrating the sentence alignment process. This process will be described step by step.

At step S11, when a pair of original and translated documents is specified, the sentence alignment unit 130 retrieves the specified documents from the document storage unit 110. Then the sentence alignment unit 130 counts the number of original sentences (n) included in the original document and the number of translated sentences (m) included in the translated document.

At step S12, the sentence alignment unit 130 selects one unselected one (X-th sentence) of the original sentences included in the original document obtained at step S11.

At step S13, the sentence alignment unit 130 calculates the position of a translated sentence to be aligned with the original sentence selected step S12. More specifically, an expression, X÷n×m±α, is used to calculate this position.

At step S14, the sentence alignment unit 130 determines whether or not all of the original sentences included in the original document have been selected at step S12. If yes, the process proceeds to step S15; otherwise, to step S12.

At step S15, the sentence alignment unit 130 creates a sentence correspondence table indicating the correspondences between the original and translated sentences on the basis of the calculation results of step S13, and outputs the table.

As described above, the sentence alignment unit 130 determines the correspondences between the original sentences and the translated sentences by estimating the position of a translated sentence corresponding to each original sentence included in the original document.

FIG. 8 illustrates a data structure of the sentence correspondence table. The illustrated sentence correspondence table 131 is created by the sentence alignment unit 130 and is given to the translated word checker 140. The sentence correspondence table 131 has columns for original sentence number and translated sentence number. The information arranged in a row is associated with each other to indicate a correspondence between original and translated sentences.

The original sentences in the original document are numbered from the first one, and the translated sentences in the translated document are likewise numbered from the first one. The original sentence number column has the number of one original sentence in the original document. The translated sentence number column has the number of at least one translated sentence in the translated document.

The example of FIG. 8 represents sentence correspondences between the original document 111 and translated document 112 illustrated in FIG. 4, using a parameter α=1. That is, the X-th original sentence is aligned with translated sentences located within a range obtained by the expression, X÷8×9±1. If the expression does not result in a natural number, digits after the decimal point are rounded off.

More specifically, 0.125 and 2.125 are calculated for the first original sentence (X=1), and these values are rounded off to the nearest integer. As a result, the first original sentence is aligned with the first and second translated sentences. Similarly, 1.25 and 3.25 are calculated for the second original sentence (X=2), and these values are rounded off to the nearest integer. As a result, the second original sentence is aligned with the first to third translated sentences. In the same way, the third original sentence is aligned with the second to fourth translated sentences, the fourth original sentence is aligned with the fourth to sixth translated sentences, the fifth original sentence is aligned with the fifth to seventh translated sentences, the sixth original sentence is aligned with the sixth to eighth translated sentences, the seventh original sentence is aligned with the seventh to ninth translated sentences, and the eighth original sentence is aligned with the eighth and ninth translated sentences.

In this way, the estimation method of the translation supporting apparatus 100 causes a translated sentence to go with a plurality of original sentences, which means that original sentences and translated sentences have a many-to-many correspondence. The parameter α is used to set an amount of such overlap.

FIG. 9 schematically illustrates an example result of the sentence alignment process. FIG. 9 illustrates aligning the fifth original sentence with translated sentences. In meaning, the fifth original sentence, "I think this is good.", corresponds to the sixth translated sentence, "Kore wa yoi to omoimasu ga, ano aidea wa warui desu." On the other hand, the translation supporting apparatus 100 estimates three sentences, the fifth to seventh translated sentences, as candidates, allowing an error margin of one sentence.

FIG. 10 is a flowchart illustrating a translated word checking process. This process will be described step by step.

At step S21, the translated word checker 140 selects one unselected one of original sentences with reference to the sentence correspondence table 131 received from the sentence alignment unit 130.

At step S22, the translated word checker 140 consults a terminology list, which has been previously specified by the user from among the terminology lists stored in the word list storage unit 120, to perform morphological analysis on the original sentence selected at step S21. Then, the translated word checker 140 searches the original sentence for original words listed in the terminology list on the basis of the results of the morphological analysis.

The morphological analysis is performed to correctly extract even words in another tense form when a terminology list includes conjugational words such as verbs. In addition, morphological analysis using a terminology list is performed to correctly extract compound words and phrases.

At step S23, the translated word checker 140 determines whether or not at least one original word listed in the terminology list has been found at step S22. If yes, the process proceeds to step S24; otherwise, to step S27.

At step S24, the translated word checker 140 selects all translated sentences aligned with the original sentence selected at step S21, with reference to the sentence correspondence table 131 received from the sentence alignment unit 130.

At step S25, the translated word checker 140 consults the terminology list to perform the morphological analysis on each of the translated sentences selected at step S24. Then, on the basis of the results of the morphological analysis, the translated word checker 140 searches the translated sentences for translated words listed in the terminology list as appropriate translations for the original words found at step S22.

At step S26, the translated word checker 140 retains correspondences among the original words found at step S22, the search results obtained at step S25, and the terminology list used for the search. The translated word search results include information indicating found translated words if they have been found, and information indicating that there is no corresponding translated word if no translated word has been found.

At step S27, the translated word checker 140 determines whether or not all of the original sentences included in the original document have been selected at step 21. If yes, the process proceeds to step S28; otherwise, to step S21.

At step S28, the translated word checker 140 outputs information relating to the correspondences between the original and translated words, retained at step S26, to the display editor 150. Then, the display editor 150 displays a translated word confirmation screen comparing the original sentences with the translated sentences on the monitor 21 on the basis of the information received from the translated word checker 140.

As described above, when the sentence alignment unit 130 determines correspondences between the original and translated sentences, the translated word checker 140 checks the translated words between aligned original and translated sentences with reference to previously specified terminology lists. Then, the display editor 150 displays, on the monitor 21, a display screen for confirming whether or not translated words of terms match a terminology list.

In the above example, though the translated word checking is performed on all original and translated sentences, it may be performed on only original and translated sentences specified by the user of the translation supporting apparatus 100. In addition, in the above example, though sequential morphological analysis is performed, morphological analysis may be performed on all original and translated sentences at the time of starting the translated word checking process.

Further, in the above example, the original sentences are subjected to the morphological analysis and then compared with the original words listed in the terminology list. However, the original sentences may be divided into n-grams of n letters (n is a natural number), which may be then compared with the original words of the terminology list. Alternatively, the original words listed in the terminology list may be directly detected from the original sentences with a string-search technology. In this connection, similar modification may be made to a process of searching translated sentences for translated words listed in the terminology list. In addition, different algorithms may be used for a process of searching original sentences and a process of searching translated sentences.

FIG. 11 illustrates the first example of a translated word confirmation screen. The illustrated translated word confirmation screen 21a is a screen that is to be displayed on the monitor 21 by the display editor 150. On the translated word confirmation screen 21a, original sentences appear on the left half of the screen while translated sentences appear on the right half of the screen.

In the case where original words listed in a terminology list appear in an original sentence and their appropriate translated words listed in the terminology list appear in the translated sentences aligned with the original sentence, the translated word confirmation screen 21a highlights the original words and the translated words. Different ways of highlighting are used according to referenced terminology lists. For example, words are highlighted in different colors according to referenced terminology lists. In addition, in the case where original words listed in a terminology list appear in an original sentence but their appropriate translated words listed in the terminology list do not appear in the translated sentences aligned with the original sentence, only the original words are highlighted.

In the example of FIG. 11, terminology lists 121 and 122 illustrated in FIG. 5 are specified for use in the translated word checking, and the terminology list 122 is specified as a main terminology list. More specifically, the original word "strategy" in the second original sentence and the translated word "senryaku" in the third translated sentence are highlighted in a display manner employed for the terminology list 121. In addition, the original word "strategy" in the forth original sentence is highlighted in such a display manner as to indicate that there is no corresponding appropriate translated word. In addition, the original word "strategy" in the seventh to eighth original sentences and the translated word "sutoratezi" in the seventh to ninth translated sentences are highlighted in a display manner employed for the terminology list 122.

When the user selects one translated word which is listed in a terminology list different from the main terminology list, and presses "change" button, the selected translated word is changed to match the main terminology list. In addition, when the user presses "all change" button, all translated words listed in terminology lists different from the main terminology list are automatically changed to match the main terminology list.

For example, referring to the example of FIG. 11, "senryaku" in the third translated sentence can be changed to "sutoratezi" which is listed in the terminology list 122 specified as a main terminology list. This reduces the user's correction workload.

It should be noted that the user can change a way of highlighting so as not to highlight a pair of original and translated words which have matched the main terminology list. This is because such translated words do not need to be changed.

FIG. 12 illustrates the second example of the translated word confirmation screen. The illustrated translated word confirmation screen 21b is a screen that is to be displayed on the monitor 21 by the display editor 150 when the user operates the translated word confirmation screen 21a illustrated in FIG. 11. As illustrated in FIG. 12, when the user specifies a position to insert a translated word in the case where the translated word corresponding to an original word does not exist in a translated sentence, candidates for the translated word are extracted from the main terminology list and displayed. When the user selects one of the candidates, the selected translated word is inserted at the specified position.

In the example of FIG. 12, the translated word "sutorathizi" exists in the fifth translated sentence but there is no such a word in the terminology list 121 or 122, and so it is determined that there is no appropriate translated word for the original word "strategy" in the fourth original sentence. When the user specifies the position of the translated word "sutorathizi", an appropriate translated word "sutoratezi" for the original word "strategy" is extracted from the terminology list 122 specified as a main terminology list, and becomes ready to be inserted. This can reduce the user's correction workload.

FIG. 13 illustrates the third example of the translated word confirmation screen. The illustrated translated word confirmation screen 21c is a screen that is to be displayed on the monitor 21 by the display editor 150 when the user operates the translated word confirmation screen 21a of FIG. 11. The translated word confirmation screen 21c displays translated words all matching the terminology list 122 specified as the main terminology list after the translated word correction is completed.

The translated word confirmation screens 21a, 21b, and 21c display all original and translated sentences. Alternatively, when the user selects one original sentence or translated sentence, only sentences having terms included in the selected sentence may be displayed. This enables the user to focus on specified terms to confirm the relations between original sentences and translated sentences.

FIGS. 11 to 13 illustrate examples where estimation of correspondences between original and translated sentences has no error. However, an error may occur in the estimation. The following describes a process of reviewing correspondences between original and translated sentences by using the results of translated word checking.

FIG. 14 schematically illustrates a principle of sentence alignment review. In this example, whether estimation of a correspondence between an original sentence and a translated sentence is appropriate or not is determined based on a matching rate with a terminology list. This matching rate with a terminology list is a rate of appropriate translated words existing in a translated sentence for original words appearing in an original document. If the matching rate with the terminology list does not reach a threshold, that is, if a rate of absence of appropriate translated words for original words is high, it is concluded that the original sentence and the translated sentence was aligned by error in the first place.

In the review, a correspondence between an original and translated sentence whose matching rate reaches the threshold is retained, and a correspondence between an original and translated sentence whose matching rate does not reach the threshold is released. Then, the original and translated sentences whose correspondence has been released are determined to be difficult to set a one-to-one correspondence therebetween, and then a many-to-many correspondence is considered.

More specifically, as illustrated in FIG. 14, consider a situation where correspondences between the A-th original sentence and the C-th translated sentence and between the B-th original sentence and the D-th translated sentence are retained, and correspondences between the (A+1)-th to (B−1)-th original sentences and the (C+1)-th to the (D−1)-th translated sentences are all released. In this situation, it is determined that the (A+1)-th to (B−1)-th original sentences and the (C+1)-th to the (D−1)-th translated sentences have a many-to-many correspondence all together.

FIG. 15 is a flowchart illustrating the sentence alignment review process. This process will be described step by step.

At step S31, the translated word checker 140 calculates a matching rate with a terminology list stored in the word list storage unit 120 with reference to the sentence correspondence table 131 received from the sentence alignment unit 130 and on the basis of the results of the translated word checking, for every correspondence between an original and translated sentence.

At step S32, the translated word checker 140 extracts correspondences between original and translated sentences whose matching rates calculated at step S31 are equal to or greater than a predetermined threshold, and issues an alignment review request together with information listing the retained correspondences to the sentence alignment unit 130.

At step S33, the sentence alignment unit 130 selects two of the correspondences between original and translated sentences extracted at step S32, in increasing order of original sentence number.

At step S34, the sentence alignment unit 130 identifies all original and translated sentences which exist between the original sentences and translated sentences identified by the two correspondences selected at step S33, and aligns the all identified original sentences with the all identified translated sentences all together.

At step S35, the sentence alignment unit 130 determines whether or not all correspondences have been selected at step S33. If yes, the process goes on to step S36; otherwise, to step S33.

At step S36, the sentence alignment unit 130 outputs a new sentence correspondence table including new correspondences determined at step S34, to the translated word checker 140.

As described above, upon receipt of an alignment review request from the translated word checker 140, the sentence alignment unit 130 releases correspondences between original and translated sentences whose matching rates with the terminology list do not reach the threshold. Then, the sentence alignment unit 130 aligns all original sentences with all translated sentences all together between original sentences and translated sentences identified by two correspondences whose matching rates are equal to or greater than the threshold. Then, the translated word checker 140 performs the translated word checking process on the basis of the results of the review again, and notifies the display editor 150 of the check results for display.

In the above example, a rate of existence of appropriate translated words for original words appearing in an original sentence is taken as a matching rate. Alternatively, a rate of existence of appropriate original words for translated words appearing in a translated sentence may be taken as a matching rate. Yet alternatively, a ratio of terms whose original word and translated word both appear to terms at least one of whose original word and translated word appears may be taken as a matching rate.

With such a translation supporting apparatus 100, correspondences between original and translated sentences are automatically estimated, which greatly reduces a translation workload. Especially, even if the original sentences and the translated sentences are different in number, high accuracy of estimation can be maintained throughout documents. Further, by appropriately setting a parameter for an expression to be used for the estimation, appropriate correspondences can be determined even if an original sentence and its translated sentence do not have the same relative positions in their documents. Even if an error occurs in estimation of correspondences, the error is automatically corrected on the basis of the results of the translated word checking which is performed at a later time, which does not require human hand to correct the sentence alignment.

Further, translated words are automatically checked between aligned original and translated sentences, which simplifies confirmation work of translated sentences. Still further, by specifying a main terminology list in advance, translated words can be corrected to match the main terminology list automatically or semi-automatically, which greatly reduces a workload of correcting translated sentences.

In the above example, though the translation supporting apparatus 100 locally stores original documents, translated documents, and terminology lists, it may obtain documents and terminology lists from other computers via a network.

The processing functions described above can be realized by a computer. In this case, a program is prepared, which describes processes for the functions to be performed by the translation supporting apparatus 100. The program is executed on a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes (MT), etc. The optical discs include Digital Versatile Discs (DVDs), DVD-RAMS, Compact Disc Read-Only Memories (CD-ROMs), CD-R (Recordable)/RW (ReWritable), etc. The magneto-optical recording media include Magneto-Optical disks (MOs) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the above program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

In the above example, a position of a translated sentence corresponding to each original sentence in a translated document is estimated based on a ratio of the number of original sentences to the number of translated sentences, and the original sentence is aligned with the translated sentence located at the estimated position. Thus even if the original sentences and the translated sentences are different in number, sentence alignment can be performed throughout documents with high accuracy. In addition, aligning original sentences with translated sentences can be automatically performed, which greatly reduces a workload of confirming translated words.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. A computer-readable, non-transitory medium storing a translation supporting program for aligning original sentences and translated sentences, the translation supporting program causing a computer to perform a procedure comprising:

retrieving a pair of original document and translated document, the original document including a plurality of original sentences, the translated document including a plurality of translated sentences;

counting a number of original sentences included in the retrieved original document and a number of translated sentences included in the retrieved translated document, and estimating a position of a translated sentence corresponding to each of the original sentences in the translated document based on a ratio of the number of original sentences to the number of translated sentences and a positional order of each of the original sentences in the original document;

aligning each of the original sentences with the translated sentence located at the estimated position, and outputting information indicating correspondences between the original sentences and the translated sentences;

checking each of the original sentences and the translated sentence aligned therewith to see if translation of each term matches a terminology list listing original words and appropriate translated words with respect to terms;

issuing an alignment review request if there are aligned original and translated sentences whose matching rate with the terminology list is less than a predetermined threshold; and in response to the alignment review request, retaining correspondences whose matching rates are equal to or greater than the predetermined threshold, releasing correspondences whose matching rates are less than the predetermined threshold, and aligning, with respect to original sentences and translated sentences whose correspondences have been released, all original sentences existing between two original sentences identified by two of the retained correspondences with all translated sentences existing between two translated sentences aligned with the two original sentences all together.

2. The computer-readable, non-transitory medium according to claim 1, wherein the aligning aligns, in addition to the translated sentence located at the estimated position, each of the original sentences with translated sentences located within a predetermined range before and after the position.

3. The computer-readable, non-transitory medium according to claim 1, the procedure further comprising correcting translated words in translated sentences which are determined by the checking as not matching the terminology list, according to the terminology list.

4. A translation supporting apparatus for aligning original sentences and translated sentences, the apparatus comprising a processor configured to perform a procedure comprising:

retrieving a pair of original document and translated document, the original document including a plurality of original sentences, the translated document including a plurality of translated sentences;

counting a number of original sentences included in the retrieved original document and a number of translated sentences included in the retrieved translated document, and estimating a position of a translated sentence corresponding to each of the original sentences in the translated document based on a ratio of the number of original sentences to the number of translated sentences and a positional order of each of the original sentences in the original document;

aligning each of the original sentences with the translated sentence located at the estimated position, and outputting information indicating correspondences between the original sentences and the translated sentences;

checking each of the original sentences and the translated sentence aligned therewith to see if translation of each term matches a terminology list listing original words and appropriate translated words with respect to terms;

issuing an alignment review request if there are aligned original and translated sentences whose matching rate with the terminology list is less than a predetermined threshold; and in response to the alignment review request, retaining correspondences whose matching rates are equal to or greater than the predetermined threshold, releasing correspondences whose matching rates are less than the predetermined threshold, and aligning, with respect to original sentences and translated sentences whose correspondences have been released, all original sentences existing between two original sentences identified by two of the retained correspondences with all translated sentences existing between two translated sentences aligned with the two original sentences all together.

5. The translation supporting apparatus according to claim 4, wherein the aligning aligns, in addition to the translated sentence located at the estimated position, each of the original sentences with translated sentences located within a predetermined range before and after the position.

6. The translation supporting apparatus according to claim 4, the procedure further comprising correcting translated words in translated sentences which are determined by the checking as not matching the terminology list, according to the terminology list.

7. A translation supporting method of a translation supporting apparatus for aligning original sentences and translated sentences, the translation supporting method comprising:

retrieving, by a processor, a pair of original document and translated document, the original document including a plurality of original sentences, the translated document including a plurality of translated sentences;

counting, by the processor, a number of original sentences included in the retrieved original document and a number of translated sentences included in the retrieved translated document, and estimating a position of a translated sentence corresponding to each of the original sentences in the translated document based on a ratio of the number of original sentences to the number of translated sentences and a positional order of each of the original sentences in the original document;

aligning, by the processor, each of the original sentences with the translated sentence located at the estimated position, and outputting information indicating correspondences between the original sentences and the translated sentences;

checking, by the processor, each of the original sentences and the translated sentence aligned therewith to see if translation of each term matches a terminology list listing original words and appropriate translated words with respect to terms;

issuing, by the processor, an alignment review request if there are aligned original and translated sentences whose matching rate with the terminology list is less than a predetermined threshold; and in response to the alignment review request, retaining, by the processor, correspondences whose matching rates are equal to or greater than the predetermined threshold, releasing correspondences whose matching rates are less than the predetermined threshold, and aligning, with respect to original sentences and translated sentences whose correspondences have been released, all original sentences existing between two original sentences identified by two of the retained correspondences with all translated sentences existing between two translated sentences aligned with the two original sentences all together.

8. The translation supporting method according to claim 7, wherein the aligning aligns, in addition to the translated sentence located at the estimated position, each of the original sentences with translated sentences located within a predetermined range before and after the position.

9. The translation supporting method according to claim 7, further comprising correcting translated words in translated sentences which are determined by the check as not matching the terminology list, according to the terminology list.

* * * * *